US010348885B2

(12) United States Patent
Covington, Jr. et al.

(10) Patent No.: US 10,348,885 B2
(45) Date of Patent: Jul. 9, 2019

(54) METHOD AND APPARATUS FOR LIMITING PORTABLE DEVICE FUNCTIONALITY

(71) Applicants: James Michael Covington, Jr., Marshville, NC (US); Christopher Dillon Covington, Rockingham, NC (US)

(72) Inventors: James Michael Covington, Jr., Marshville, NC (US); Christopher Dillon Covington, Rockingham, NC (US)

(*) Notice: Subject to any disclaimer, the term of this patent is extended or adjusted under 35 U.S.C. 154(b) by 53 days.

(21) Appl. No.: 15/798,266

(22) Filed: Oct. 30, 2017

(65) Prior Publication Data

US 2018/0124234 A1 May 3, 2018

Related U.S. Application Data

(60) Provisional application No. 62/414,776, filed on Oct. 30, 2016.

(51) Int. Cl.
| | |
|---|---|
| *H04M 3/00* | (2006.01) |
| *H04M 1/725* | (2006.01) |
| *H04L 29/08* | (2006.01) |
| *H04W 4/02* | (2018.01) |
| *H04W 76/14* | (2018.01) |

(52) U.S. Cl.
CPC ........ *H04M 1/72577* (2013.01); *H04L 67/12* (2013.01); *H04L 67/18* (2013.01); *H04L 67/306* (2013.01); *H04W 4/023* (2013.01); *H04W 76/14* (2018.02)

(58) Field of Classification Search
USPC ........................................ 455/418, 456; 1/1
See application file for complete search history.

(56) References Cited

U.S. PATENT DOCUMENTS

| | | | | |
|---|---|---|---|---|
| 9,641,985 | B2 * | 5/2017 | O'Malley | H04W 4/046 |
| 9,933,265 | B2 * | 4/2018 | Fernandez | G01C 21/206 |
| 10,057,837 | B2 * | 8/2018 | Martono | H04W 4/029 |
| 2010/0231369 | A1 * | 9/2010 | Oya | B60R 25/00 340/426.11 |
| 2014/0058632 | A1 * | 2/2014 | Jungman | B60K 28/063 701/48 |
| 2015/0382156 | A1 * | 12/2015 | Gruteser | H04W 4/046 455/456.1 |
| 2016/0318475 | A1 * | 11/2016 | Honkanen | G07C 9/00182 |
| 2017/0105101 | A1 * | 4/2017 | Santavicca | H04B 17/27 |
| 2017/0174178 | A1 * | 6/2017 | Nixon | B60R 25/10 |

* cited by examiner

*Primary Examiner* — David Q Nguyen
(74) *Attorney, Agent, or Firm* — Wilson Dutra, PLLC; Camille A. Wilson

(57) ABSTRACT

The present disclosure relates generally to a system and method of reducing driver distractions from a portable device. More specifically, the present disclosure provides a driver communication safety system of limiting portable device functionality within a vehicle for safety purposes. According to the present disclosure, a proximity beacon may be placed within a vehicle and paired with a portable device, wherein the pairing may allow the driver communication safety system to control select applications and block access during predefined threshold activity, such as a threshold vehicle speed. In some embodiments, an administrator may control functionality of one or more portable devices used by a driver within a calibrated shielded zone of a vehicle.

20 Claims, 15 Drawing Sheets

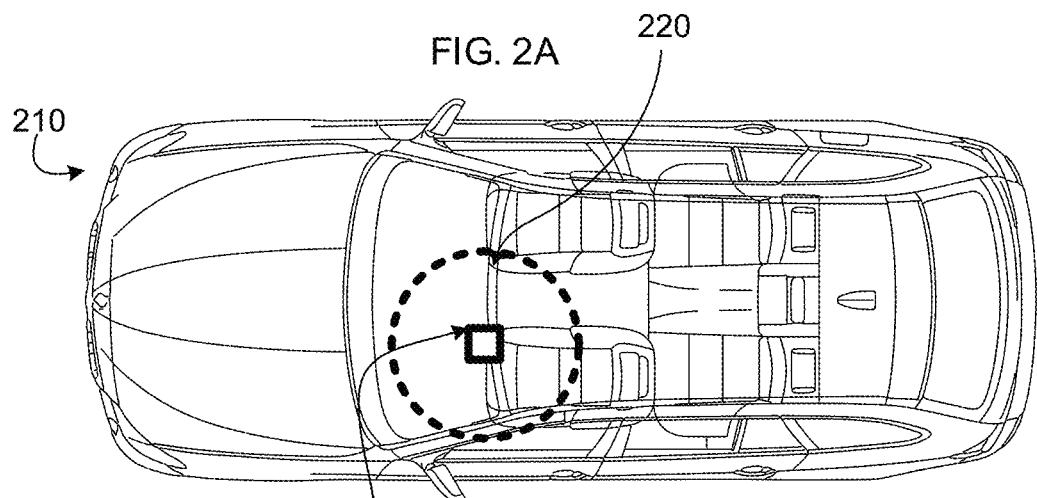
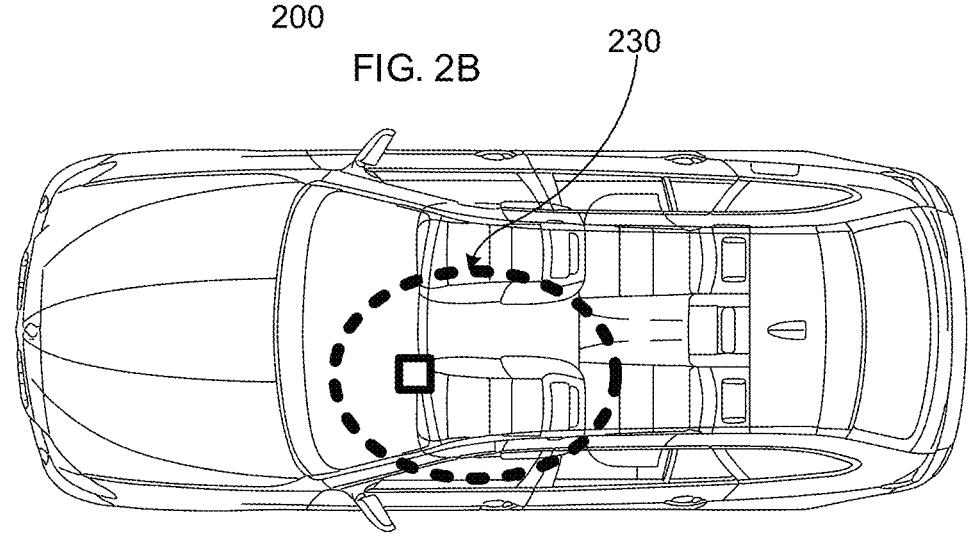
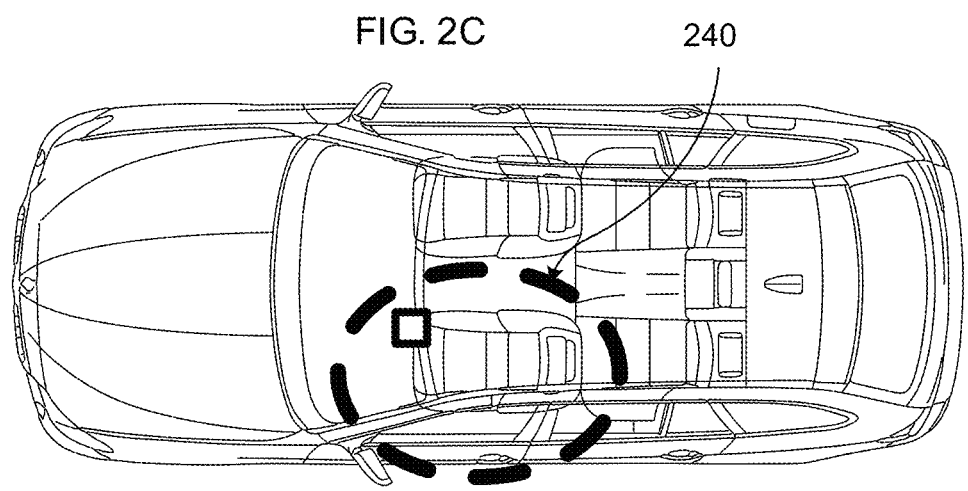

EMAIL:

PASSWORD:

[ LOG IN ]   [ CREATE ACCOUNT ]

1430 →

BEACON ID:

VEHICLE:

[ ADD BEACON ]

1460 →

SELECT BEACON: ▼

PHONE NUMBER:

BEACON NICKNAME:

FIRST NAME:

LAST NAME:

[ ADD PORTABLE DEVICE ]

METHOD AND APPARATUS FOR LIMITING PORTABLE DEVICE FUNCTIONALITY

CROSS-REFERENCE TO RELATED APPLICATION

This application claims priority to and the full benefit of U.S. Provisional Patent Application Ser. No. 62/414,776, filed Oct. 30, 2016, and titled "METHOD AND APPARATUS FOR LIMITING PORTABLE DEVICE FUNCTIONALITY", the entire contents of which are incorporated in this application by reference.

BACKGROUND OF THE DISCLOSURE

In a hyper-connected society, there is a pressure to remain connected to personal devices at all times. In fact, mobile devices have revolutionized day-to-day interpersonal relationships and, in some situations, dominate every aspect of someone's day. As a result of this pervasiveness, people are encouraged to focus on the task at hand and to maximize every moment of every day. If someone is not overstimulated at any given moment, it is a conscious choice on that person's part. This permeates throughout society and is particularly pervasive when people are in a contained environment and have to spend an extended period of time together. It only takes a few seconds on a subway, metro, or bus to see faces buried in some sort of device. Social ramifications aside, this presents an issue when someone needs to pay attention to what they are doing. For instance, it is particularly dangerous to try to drive while also being engaged on the phone in some way.

State and local legislatures have attempted to curb the issue of texting while driving or otherwise engaging in cell phone behavior in some unauthorized or potentially disastrous manner while in control of a car. With increasing news reports of accidents occurring due to people being distracted by cell phones, it is clear that people are at a greater risk of endangering others when they are preoccupied by their phones. However, some uses might be permissible, like calling someone if there is an emergency or checking pre-set directions to make sure nothing has changed en route to the correct location.

So far, talking on a hand-held cellphone while driving is banned in fourteen states and the District of Columbia. The use of all cellphones by novice drivers is restricted in thirty-seven states and the District of Columbia. Text messaging is banned for all drivers in forty-six states and the District of Columbia.

Employers, parents, and governments all have a vested interest in keeping people safe, especially if they are operating cars, trucks, or motorcycles. In 2014, the National Safety Council reported that cell phone use was estimated to be involved in about 26% of all motor vehicle crashes, an increase from the year prior. In 2015, the Centers for Disease Control stated that over eight people were killed each day and 1,161 were injured due to distracted driving, which included cell phone usage or eating. In a Consumer Guide report, the Federal Communications Commission stated that forty percent of American teens stated that they had been in a car when the driver used a cell phone in a way that put people in danger. In that same report the Virginia Tech Transportation Institute found that text messaging created a crash risk twenty-three times worse than driving while not distracted.

There have been attempts to dissuade from distracted driving, increase focus on the road, and encourage proper, traditional driving etiquette. These solutions normally come with a trade-off, such as completely limiting a driver from using their cell phone, blocking every device within a car from being able to use their phones, or requiring an external device to block usage.

SUMMARY OF THE DISCLOSURE

What is needed, therefore, is a targeted device that can pair with a mobile phone, ascertain when a person is a driver in a car, and activate to limit or block cell phone usage pursuant to certain permissions integrated or programmed into the phone. Administrators can limit application permissions for whoever will be driving, with limitations being set in the moment, pre-set or prior to driving, or based on feedback from the mobile phone itself, while also having built-in functionality to be able to supervise what the driver is doing and what activities they are engaging in. This may include seeing where a driver is located, at what speed they are driving, whether they have attempted to use their phone while driving, whether the driver has entered an address into their navigation, whether there is traffic or accidents on the route, or whether there are any storm warnings in effect or in the driver's route.

This functionality is particularly important for young adults who have recently received their driving permits or driver's licenses and for employees who drive company cars or otherwise represent a business. This allows for oversight on the backend for a parent or a supervisor to see what a driver is doing and to reduce the risk of potentially dangerous behavior. It also allows for the review of safety following a trip, developing good habits, or rehabilitating drivers who have had incidents in the past. Further, this technology limits the control to a limited shielded area so that if passengers try to use their mobile phones in the car, their respective usage may not be affected or inhibited.

The present disclosure relates generally to a system and method of reducing driver distractions from a portable device. More specifically, the present disclosure provides a system of limiting portable device functionality within a vehicle for safety purposes. According to the present disclosure, an administrator may control functionality of one or more portable devices used by a driver within a calibrated shielded zone of a vehicle.

The present disclosure relates to a driver communication safety system of one or more computers that may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions.

In some aspects, the driver communication safety system may comprise a first proximity beacon configured to be placed in a first vehicle and paired with a first portable device, where placement of the first proximity beacon in the first vehicle creates a first shielded zone including a first designated safety area where the driver communication safety system is functional. In some aspects, the driver communication safety system may comprise one or more wireless communication interfaces; one or more memory resources including a user profile database including a plurality of user profiles, where each user profile may comprise at least a first proximity beacon identifier, where the first proximity beacon identifier identifies the first proximity beacon, and a first portable device identifier, where the first portable device identifier identifies the first portable device; and one or more processors.

In some aspects, the one or more processors may be configured to receive the first proximity beacon identifier; receive the first portable device identifier; access the user profile database; validate a user profile link between the first proximity beacon identifier and the first portable device identifier; receive a first proximity data including an indication that the first portable device is located within the first shielded zone; activate the first shielded zone, where the activation limits a predefined set of functionalities of the first portable device based on predefined activation threshold criteria including at least a presence of the first portable device within the first shielded zone; receive a second proximity data including an indication that the first portable device is located outside the first shielded zone; and deactivate the first shielded zone, where the deactivation releases the limitation of the predefined set of functionalities of the first portable device based on predefined deactivation threshold criteria including at least a removal of the first portable device from the first shielded zone. Other embodiments of this aspect include corresponding computer systems, apparatus, and computer programs recorded on one or more computer storage devices, each configured to perform the actions of the methods.

Implementations may include one or more of the following features. In some aspects, the one or more processors may be further configured to retrieve the predefined activation threshold criteria; and retrieve the predefined deactivation threshold criteria. In some aspects, the one or more processors may be further configured to monitor for the predefined activation threshold criteria; and monitor for the predefined deactivation threshold criteria. In some aspects, the one or more processors may be further configured to transmit monitoring data to the user profile database, where the monitoring data may comprise data gathered through the monitoring of the predefined activation threshold criteria and the predefined deactivation threshold criteria.

In some aspects, one or both the predefined activation threshold criteria and the releasing threshold criteria may comprise a threshold vehicle speed, and where the one or more processors may be further configured to receive vehicle speed data. In some aspects, the vehicle speed is received from one or both the first proximity beacon and the first portable device. In some aspects, the first proximity beacon may be portable. In some aspects, the first shielded zone may comprise a fixed distance range from the first proximity beacon. In some aspects, the one or more processors may be further configured to prompt calibration of the first shielded zone. In some aspects, the first shielded zone may be based on predefined characteristics of the first vehicle and the location of the first proximity beacon.

In some aspects, each of the plurality of user profiles further may comprise vehicle identifying data, where the vehicle identifying data associates the first vehicle with the first proximity beacon and the first portable device. In some aspects, the first proximity beacon may be integrated into the first vehicle. In some aspects, the first proximity beacon may be further configured to be placed in a second vehicle, where placement of the first proximity beacon in the second vehicle may create a second shielded zone including a second designated safety area where the driver communication safety system is functional, and where the one or more processors are further configured to receive a third proximity data including an indication that the first portable device is located within the second shielded zone; activate the second shielded zone, where the activation limits the predefined set of functionalities of the first portable device based on predefined activation threshold criteria including at least a presence of the first portable device within the second shielded zone; receive a fourth proximity data including an indication that the first portable device is located outside the second shielded zone; and deactivate the second shielded zone, where the deactivation releases the limitation of the predefined set of functionalities based on predefined deactivation threshold criteria including at least a removal of the first portable device from the second shielded zone.

In some aspects, the vehicle identifying data may further associate the second vehicle with the first proximity beacon and the first portable device. In some aspects, the first shielded zone may comprise a first distance from the first proximity beacon and the second shielded zone may comprise a second distance from the first proximity beacon. In some aspects, the first proximity beacon may be further configured to be paired with a second portable device. In some aspects, at least a portion of the plurality of user profiles may comprise a second portable device identifier, where the second portable device identifier identifies the second portable device; and the one or more processors are further configured to receive the second portable device identifier; access the user profile database; validate a user profile link between the first proximity beacon identifier and the second portable device identifier; receive a third proximity data including an indication that the second portable device is located within the first shielded zone; activate the first shielded zone, where the activation limits a predefined set of functionalities of the second portable device based on predefined activation threshold criteria including at least a presence of the second portable device within the first shielded zone; receive a fourth proximity data including an indication that the second portable device is located outside the first shielded zone; and deactivate the first shielded zone, where the deactivation releases the limitation of the predefined set of functionalities of the second portable device based on predefined deactivation threshold criteria including at least a removal of the second portable device from the first shielded zone.

In some aspects, the predefined set of functionalities of the first portable device may be different from the predefined set of functionalities of the second portable device. In some aspects, a second proximity beacon may be configured to be placed in the first vehicle and paired with the first portable device, where placement of the second proximity beacon in the first vehicle creates a second shielded zone including a second designated safety area where the driver communication safety system is functional. In some aspects, at least a portion of the plurality of user profiles may comprise a second proximity beacon identifier, where the second proximity beacon identifier identifies the second proximity beacon; and where the one or more processors are further configured to receive the second proximity beacon identifier; validate a user profile link between the second proximity beacon identifier and the first portable device identifier; receive a third proximity data including an indication that the first portable device is located within the second shielded zone; activate the second shielded zone, where the activation limits the predefined set of functionalities of the first portable device based on predefined activation threshold criteria including at least a presence of the first portable device within the second shielded zone; receive a fourth proximity data including an indication that the first portable device is located outside the second shielded zone; and deactivate the second shielded zone, where the deactivation releases the limitation of the predefined set of functionalities of the first portable device based on predefined deactivation threshold criteria including at least a removal of the first portable device from the second shielded zone.

In some aspects, the plurality of user profiles may further comprise the predefined set of functionalities of the first portable device, the predefined activation threshold criteria, and the predefined deactivation threshold criteria. In some aspects, the one or more processors may be further configured to receive controlled functionality preferences, where the controlled functionality preferences identify the predefined set of functionalities of the first portable device. In some aspects, the one or more processors may be further configured to receive predefined activation threshold preferences, where the predefined activation threshold preferences identify the predefined activation threshold criteria. In some aspects, the one or more processors may be further configured to receive predefined deactivation threshold preferences, where the predefined deactivation threshold preferences identify the predefined deactivation threshold criteria. Implementations of the described techniques may include hardware, a method or process, or computer software on a computer-accessible medium.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 2A illustrates an exemplary calibration step, wherein a shielded zone is illustrated in a calibrated vehicle.

FIG. 2B illustrates an exemplary calibration step, wherein a shielded zone is illustrated in a calibrated vehicle.

FIG. 2C illustrates an exemplary calibration step, wherein a shielded zone is illustrated in a calibrated vehicle.

FIG. 14 illustrates an exemplary profile initializing graphical user interfaces (GUI).

DETAILED DESCRIPTION

Figure 1:
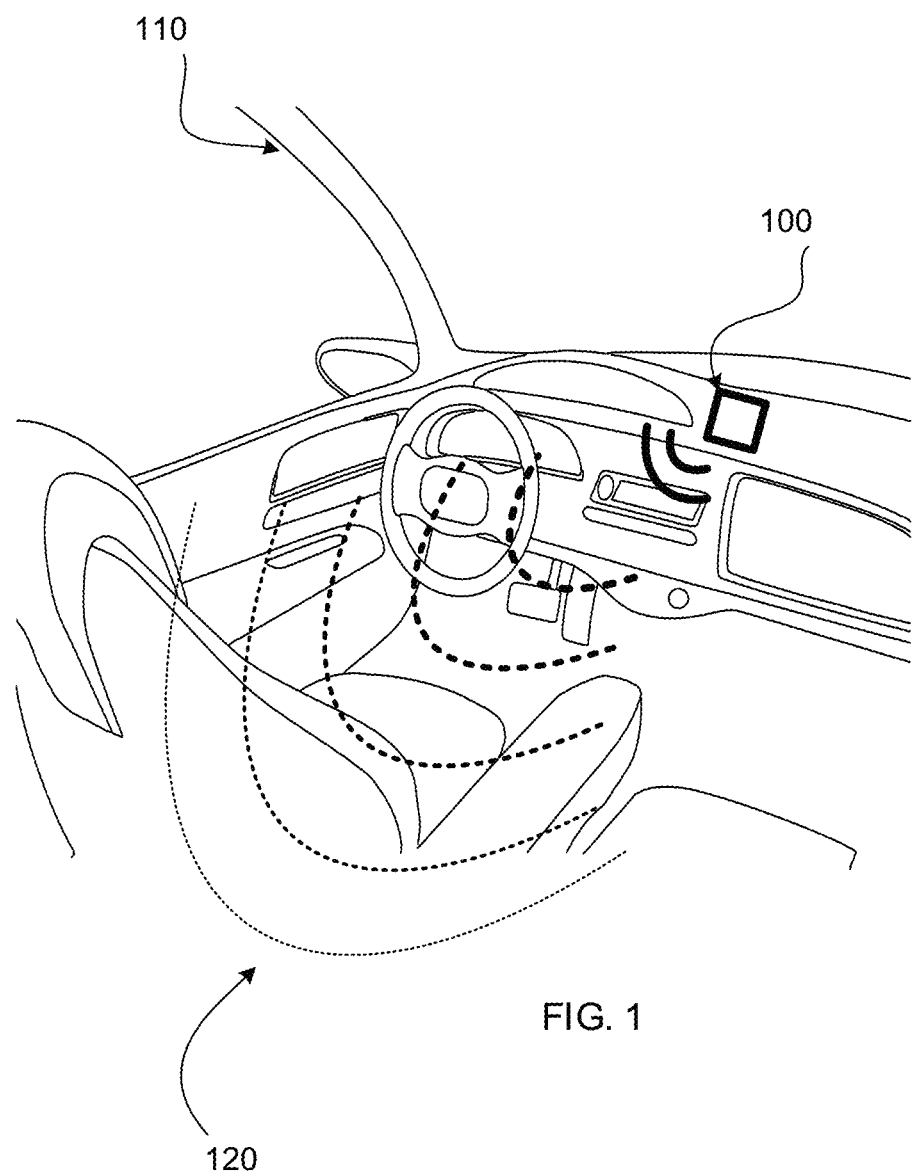
FIG. 1 illustrates an exemplary calibrated vehicle with proximity beacon.

The present disclosure relates generally to a system and method of reducing driver distractions from a portable device. More specifically, the present disclosure provides a system of limiting portable device functionality within a vehicle for safety purposes. According to the present disclosure, an administrator may control functionality of one or more portable devices used by a driver within a calibrated shielded zone of a vehicle.

In the following sections, detailed descriptions of examples and methods of the disclosure will be given. The description of both preferred and alternative examples, though thorough, are exemplary only, and it is understood that, to those skilled in the art, variations, modifications, and alterations may be apparent. It is therefore to be understood that the examples do not limit the broadness of the aspects of the underlying disclosure as defined by the claims.

Glossary

Proximity Beacon: as used herein refers to a communication device, wherein the placement of a beacon within a vehicle may define the secure zone.

Shielded Zone: as used herein refers to an area within a vehicle, wherein at least some of the functionality of a controlled portable device located within the secure zone may be controlled.

Controlled Portable Device ("CPD"): as used herein refers to a portable device that may be linked to the driver communication safety system, wherein an administrator may limit functionality of the controlled portable device located within a shielded zone of a calibrated vehicle. For example, controlled portable devices may include a smartphone, tablet, smartwatch, wearable, internet or online connected device, communication radio, or other portable device. In some aspects, functionality of communication applications on the controlled portable devices may be limited when the controlled portable device is located within a shielded zone.

Administrator: as used herein refers to a user who has control over the communication settings of the controlled portable device.

Control Interface: as used herein refers to a portal or onboarding interface within the driver communication safety system, wherein the portal or onboarding interface may allow one or both the administrator or driver to interact with the driver communication safety system. For example, the control interface may allow access to profile information, policy settings, and driver communication safety system data. In some aspects, an administrator may have access to a separate control interface than the driver.

Driver: as used herein refers to a person who is designated as an operator of a calibrated vehicle.

Policy Settings: as used herein refers to the permissions and limitations of communication applications of a controlled portable device.

Calibrated Vehicle: as used herein refers to any vehicle with a shielded zone that has been calibrated with a proximity beacon. For example, a vehicle may include cars, trucks, airplanes, heavy machinery, recreational vehicles, motorcycles, bicycles, mopeds, jet skis, go-carts, dirt bikes, four-wheelers, golf carts, school buses, ride-sharing programs, trains, as non-limiting examples.

Driver Communication Safety System ("DCSS"): as used herein refers to a system that may limit functionality of a controlled portable device.

Referring now to FIG. 1, an exemplary calibrated vehicle 110 with proximity beacon 100 is illustrated. In some aspects, a shielded zone 120 may comprise an area of diminishing control, wherein the area closest to the proximity beacon 100 may be the most powerful and then diminishes with distance from the proximity beacon. In some such embodiments, controlled portable devices may be calibrated to pair with a proximity beacon 100 when it detects a threshold signal, wherein a controlled portable devices carried by a passenger may be out of range of the proximity beacon 100. A threshold signal may be established through wireless tracking technology, such as Bluetooth, near field communication (NFC), Wi-Fi, radio frequency identification (RFID), global positioning system (GPS), geographic information systems (GIS), wireless local area network (WLAN), as non-limiting examples.

In some implementations, the strength of the proximity beacon may be set by an administrator, who can make a determination based on the knowledge of the calibrated vehicle or if other devices may interfere with the signal. In some embodiments, an administrator may be notified, based on policy settings, if a driver removes a controlled portable device from the shielded zone. In response, an administrator may extend the shielded zone to reach the controlled portable device. An administrator may also be notified depending on certain conditions, also elaborated on below, such as a sudden stop or rapid acceleration.

Referring now to FIGS. 2A-2C, an exemplary calibration progress is illustrated, wherein each progressive shielded zone 220, 230, 240 is a more accurate area within a calibrated vehicle 210. In some embodiments, a driver may use a controlled portable device to calibrate a proximity beacon 200, wherein one or both the proximity beacon 200 or the control interface may prompt a driver or administrator to place the controlled portable device at specific locations within a vehicle. For example, a driver may be prompted to place the controlled portable device at the steering wheel base, the headrest, the door, and the center console.

In some aspects, such as illustrated in FIG. 2A, a proximity beacon 200 may have a default shielded zone 220, which may comprise a fixed distance range from the proximity beacon 200. For example, the proximity beacon 200 may have a shielded zone 220 built around calibration averages or a symmetrical shape. In some embodiments, such as illustrated in FIG. 2B, the shielded zone 230 of a proximity beacon 200 may be calibrated to a more accurate area, such as with instructed calibration steps or receipt of profile information, including, for example, vehicle type, height of driver, and driver preferences. In some aspects, such as illustrated in FIG. 2C, the shielded zone 240 of a proximity beacon 200 may be further refined.

In some aspects, a proximity beacon may be self-calibrating, wherein the proximity beacon may detect solid objects within a calibrated vehicle, such as through sonar recognition. For example, where a proximity beacon may be installed into a vehicle, a calibration function may be activated, and the proximity beacon may discern the interior dimensions of the vehicle. In some aspects, such as where the proximity beacon may be portable, such as those illustrated in FIG. 4A-FIG. 6, the proximity beacon may dynamically respond to any vehicle a driver may operate. In some implementations (not pictured) the proximity beacon may be integrated within a manufacturer's device or installed by a manufacturer pre-calibrated for use with a controlled portable device or user.

A dynamic calibration may allow for a driver to switch between vehicles without requiring separate calibration of each vehicle. For example, a driver may work for a trucking company with a fleet of tractor-trailers from different manufacturers, wherein the driver may drive different tractor-trailers from day to day. A dynamic calibration may allow for a seamless transition between vehicles without requiring any affirmative step by the driver or administrator between vehicles. In some aspects, a vehicle identifier may be placed in each vehicle, wherein the proximity beacon may receive the identifying information to establish the calibration parameters. The proximity beacon may be paired with a user to create a unique identifier, allowing an administrator to identify what calibrated vehicles are being used and/or when they are being switched out, simplifying any tracking logs for determining who used a vehicle when.

For example, the trucking company may manually calibrate their entire fleet one time and place vehicle identifiers in each truck. Their drivers may each be assigned a company proximity beacon that may recognize the vehicle identifiers. The trucking company may be considered the administrator and may be able to track one or both driver and vehicle history. In some aspects, each vehicle may be installed with a proximity beacon, wherein a controlled portable device may be linked with a plurality of proximity beacons, wherein each proximity beacon may be associated with a driver or group of drivers. In some embodiments, a proximity beacon may be associated with multiple controlled devices, which may belong to the same or different drivers.

Figure 3:
FIG. 3 illustrates an exemplary key chain with proximity beacon.

Referring now to FIG. 3, an exemplary key chain 300 with proximity beacon 305 is illustrated. In some aspects, a proximity beacon 305 may be portable, wherein a driver may carry the proximity beacon 305, such as attached to a key chain 300. In some aspects, a proximity beacon may further comprise other functionality, such as a flash light, key sensor integration, laser pointer, or other tool.

Figure 4A:
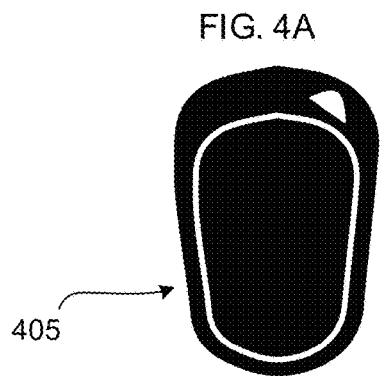
FIG. 4A illustrates an exemplary embodiment of a proximity beacon in a closed view.
Figure 4B:
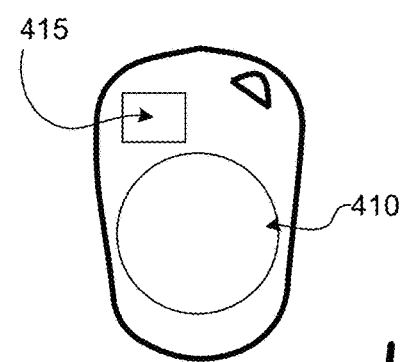
FIG. 4B illustrates an exemplary embodiment of a proximity beacon in an open view.

Referring now to FIG. 4A, an exemplary embodiment of a proximity beacon 405 is illustrated in a closed view. Referring now to FIG. 4B, an exemplary proximity beacon 405 is illustrated in an open view. In some aspects, the proximity beacon 405 may comprise a rechargeable or replaceable power source 410, including, for example, a battery. In some embodiments, the proximity beacon 405 may comprise a communication device 415, including, for example, one or more receiver, transmitter, and sensor.

Figure 5:
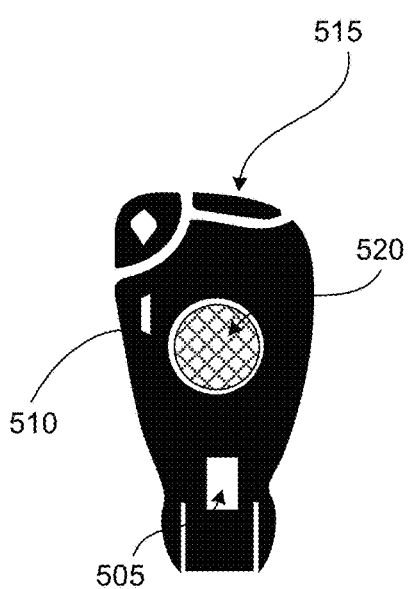
FIG. 5 illustrates an alternate exemplary proximity beacon.

Referring now to FIG. 5, an alternate exemplary proximity beacon 505 is illustrated, wherein the proximity beacon 505 may be integrated into a car key. In some aspects, the proximity beacon 505 may be integrated into a car key during the manufacturing process, wherein each manufactured vehicle may comprise a calibrated vehicle. For example, a manufacturer may pre-program the proximity beacon 505 with the dimensions of a vehicle and calibration parameters, wherein a buyer may not need to calibrate the proximity beacon 505. In some embodiments, the proximity beacon 505 may comprise a location mechanism, wherein the proximity beacon 505 may be programmed to recognize its position within the vehicle, which may allow for dynamic adjustment for the shielded zone. In some aspects, a vehicle may not require the insertion of the car key for ignition, wherein the vehicle may ignite when the car key is located within the vehicle.

In some aspects, the proximity beacon 505 may comprise one or more power sources 510, 520. In some embodiments, at least one power source 510, 520 may be passively or manually rechargeable. For example, a solar power source 520 may allow for some recharging during daylight hours of driving. In some embodiments, the proximity beacon 505 may comprise a microUSB port or a variation thereof, wherein the proximity beacon 505 may be charged with any charging mechanism using the microUSB.

Figure 6:
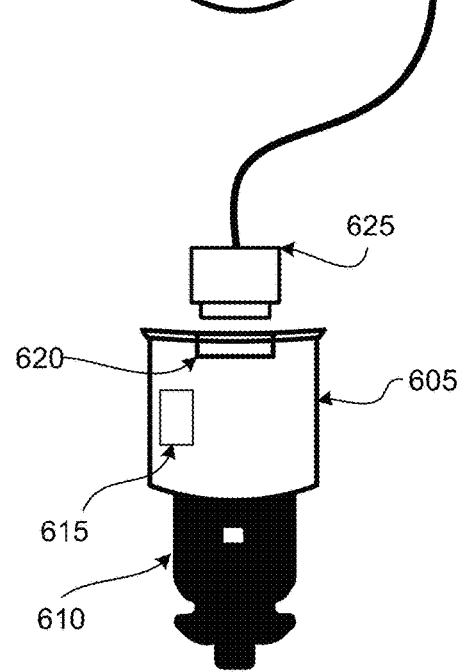
FIG. 6 illustrates an alternate exemplary proximity beacon.

Referring now to FIG. 6, an alternate exemplary proximity beacon 605 is illustrated, wherein the proximity beacon 605 may be integrated into a lighter adapter 610. In some aspects, a proximity beacon 605 integrated into a lighter adapter may limit the need for an independent power source. In some aspects, the lighter adapter may further comprise a charging port 620, wherein an electronic source may be connected through a wired connector 625. In some implementations, the proximity beacon may include an auxiliary port 615 for expanded functionality, such as for an additional USB port, additional memory storage, or tracking functionality.

Figure 7:
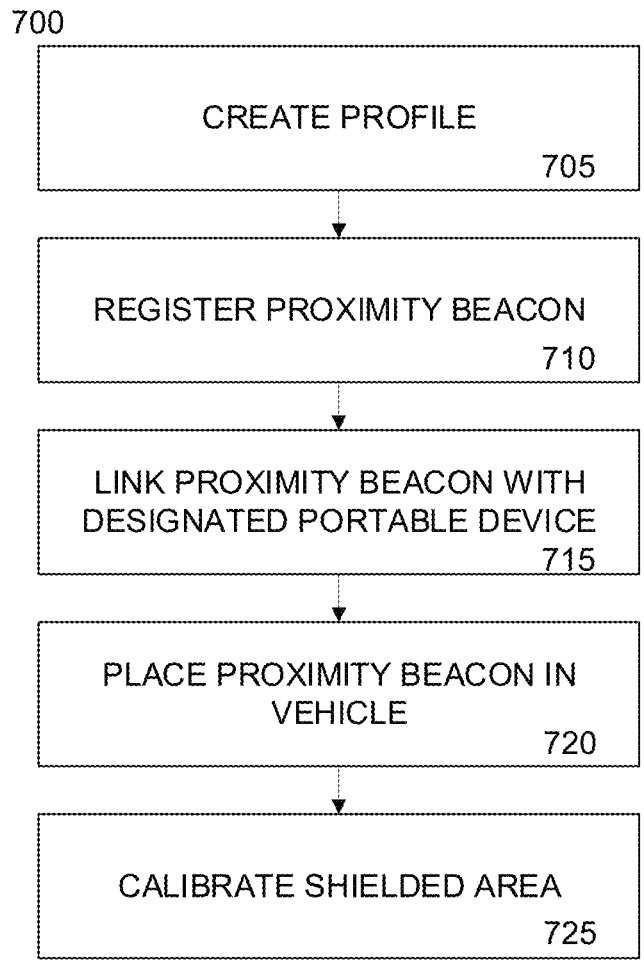
FIG. 7 illustrates exemplary method steps for initiating a driver communication safety system.

Referring now to FIG. 7, exemplary method steps 700 for initiating a driver communication safety system are illustrated. At 705, a profile may be created, wherein the profile may comprise at least the name of the driver, a portable device, and at least one vehicle. At 710, a proximity beacon may be registered, wherein the registration may link the proximity beacon to the profile. At 715, the proximity beacon may be paired with the portable device added to the profile at 705. At 720, the proximity beacon may be placed in the vehicle. At 725, the proximity beacon may be calibrated within the vehicle, wherein the controlled zone targets the driver area.

Figure 8:
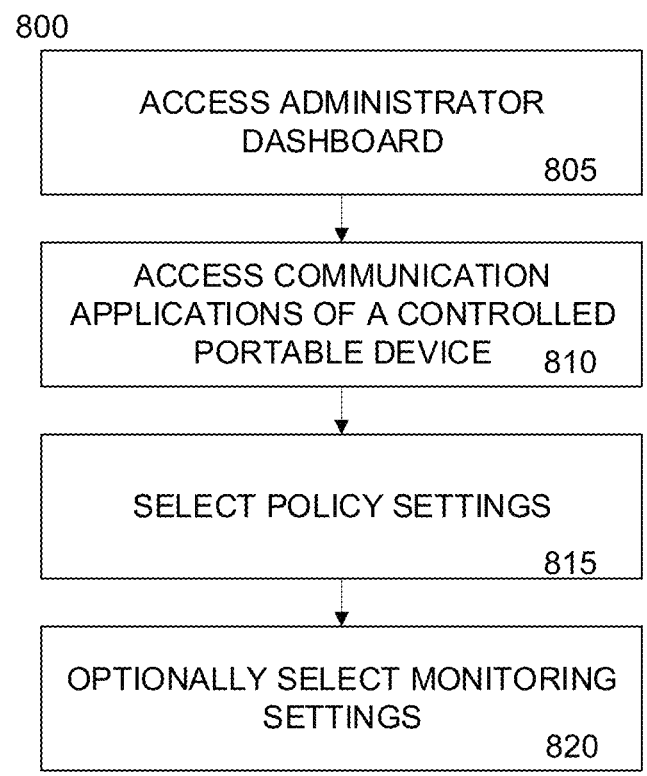
FIG. 8 illustrates exemplary method steps for administrative set up of policy settings.

Referring now to FIG. 8, exemplary method steps 800 for administrative set up of policy settings are illustrated. At 805, an administrator dashboard may be accessed. At 810, communication applications of a controlled portable device may be accessed. In some embodiments, communication applications may include applications that allow the driver to communicate with a third party, such as text applications, call applications, social media applications, and/or emergency applications. In some aspects, communication applications may include any application that may allow for driver interface, which may expand the applications to include games, internet access applications, or searchable or browsable applications, such as IMDB, Etsy, or a photo gallery.

At 815, policy settings may be selected. In some aspects, policy settings may comprise a selection of communication applications that may be controlled in the shielded zone. In some embodiments, policy settings may include selecting predefined threshold criteria that may trigger one or both the activation of the shielded zone and limiting functionality of the controlled portable device. For example, threshold settings may include a minimum speed where it may become dangerous to access the communication applications or a minimum speed that triggers or activates the driver communication safety system. An administrator may adjust these settings as necessary or appropriate.

In some implementations, predefined activation threshold criteria may be the same as predefined deactivation threshold criteria. For example, exceeding 15 MPH may trigger a limitation of functionality and driving below 15 MPH may release functionality. In some embodiments, predefined activation threshold criteria may be different than predefined deactivation threshold criteria. For example, exceeding 15 MPH may trigger a limitation of functionality and coming to a complete stop for a sustained period of time, such as five minutes, may release functionality. Creating different threshold criteria for the releasing of functionality may account for typical driving conditions, which may require slowing for changes in speed limits and stopping for traffic lights, stop signs, and congestion. In some embodiments, the driver communication safety system may provide universal threshold settings that may initially apply to all drivers. In some implementations, the universal threshold settings may be customized by an administrator, wherein the customized threshold settings may be stored with the user profile.

In some aspects, threshold settings may include driving conditions that may be monitored by separate applications, such as Google Maps or weather applications, as non-limiting examples. In some implementations, the threshold settings may be limited to data that may be accessed from applications local to the controlled portable device. In some embodiments, the driver communication safety system may access real-time data from third parties, wherein the real-time data may allow for a range of threshold settings.

As an illustrative example, the threshold settings may include minimum speed, maximum traffic congestion, and specific weather conditions. The shielded zone may be activated when the calibrated vehicle reaches the minimum speed. The shielded zone may remain activated even if the calibrated vehicle reduces in speed if traffic congestion is high, such as reported by Google Maps or a traffic application via third-party or native application program interface integration. Similarly, if weather conditions make the roads dangerous, the shielded zone may be active until the calibrated vehicle is turned off. For example, icy or foggy conditions may meet the threshold for dangerous conditions.

Figure 17:
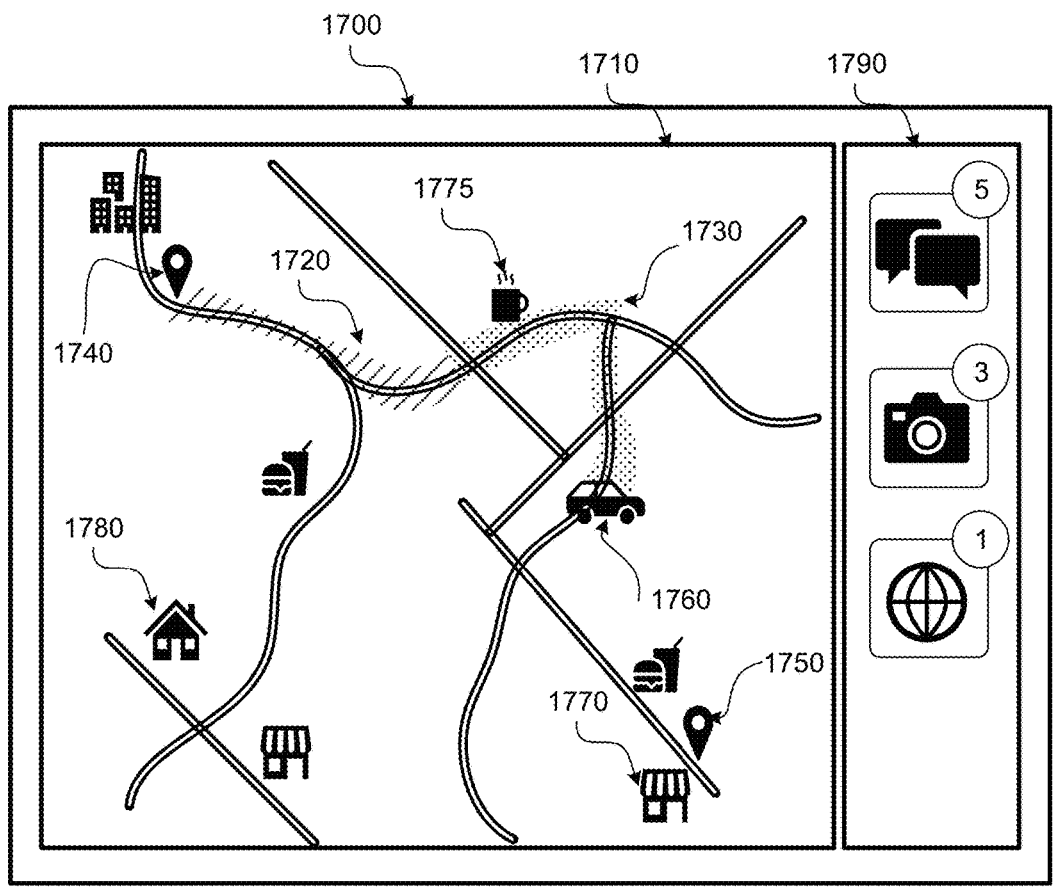
FIG. 17 illustrates an exemplary monitoring graphical interface (GUI).

In some aspects, threshold settings may be further customizable, wherein specific conditions may release blocking of one or more of the stored applications. For example, a severe storm that may evolve into a hurricane may release emergency access to some stored applications. In some implementations, this functionality may be released when the severe weather conditions are paired with activities by the driver, such as coming to a sudden stop, rapid acceleration, abrupt changes in traffic patterns, prolonged congestion, or terrain issues or changes. In some aspects, at 820, monitoring settings may be selected, wherein monitoring settings may allow for tracking of selected parameters. For example, location and speed may be monitored, wherein details of movement may be stored and accessed at one or both the administrator or driver dashboard. In some aspects, as illustrated in FIG. 17, travel history may be displayed as an overlay over a map, which may be accessed from a third party service.

In some embodiments, a parent may want to monitor the travel patterns of their children. For example, a parent may not care that their child pass through portions of town, but may want notification if the child stops for an extended period in certain areas of town, such as a bar, an area designated by a parent as off-limits, or outside permissible places to be past curfew. An administrator, in this instance a parent, may also configure settings to be notified if there is an accident on the user's programmed route home, and may in turn recommend alternative routes in real-time.

In some aspects, the driver communication safety system may detect accident parameters, such as a sudden stop or a sudden change in vehicle orientation. In some implementations, the detection of the accident parameters may initiate an emergency communication, such as a call to a predefined recipient. For example, detection of accident parameters may initiate a call to 911 or to the administrator associated with the portable device. In some embodiments, the vehicle may comprise an aircraft, wherein passengers may pre-register portable devices that may be controlled during flight. In some aspects, one or more proximity beacons may be integrated into the vehicle. A plurality of proximity beacons may allow for pairing with a larger number of portable devices and for a greater distance than a single proximity beacon.

Figure 9:
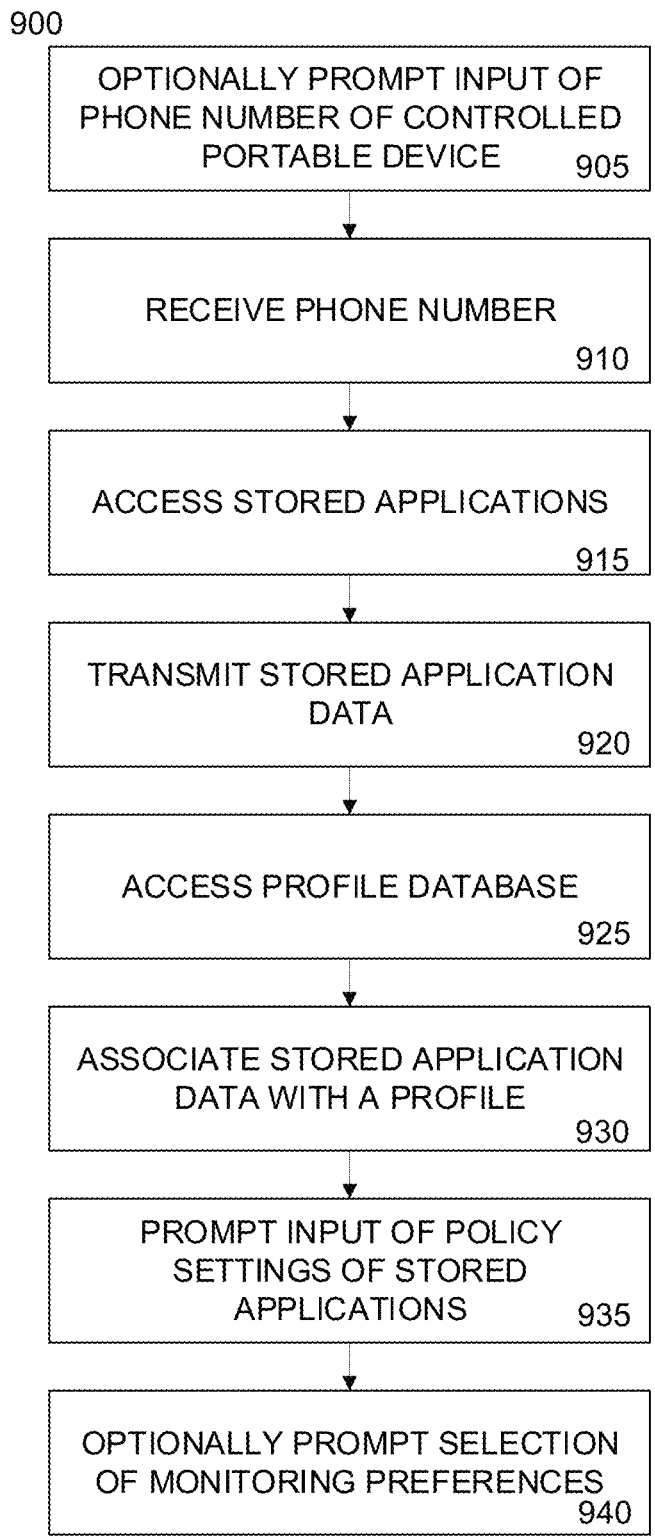
FIG. 9 illustrates exemplary method steps for initializing stored application settings.

Referring now to FIG. 9, exemplary method steps 900 for initializing stored application settings are illustrated. In some aspects, at 905, input of the phone number of the controlled portable device may be prompted. At 910, the phone number of the controlled portable device may be received. In some embodiments, the driver communication safety system may automatically receive the phone number of the controlled portable device, such as when the driver communication safety system application is activated and linked with an active proximity beacon.

At 915, stored application of the controlled portable device may be accessed. At 920, stored application data may be transmitted, such as to a driver communication safety system server. At 925, a profile database may be accessed. At 930, the stored application data may be associated with a driver profile. At 935, input of policy settings for the stored applications may be prompted. In some embodiments, at 940, selection of monitoring preferences may be prompted.

Figure 10:
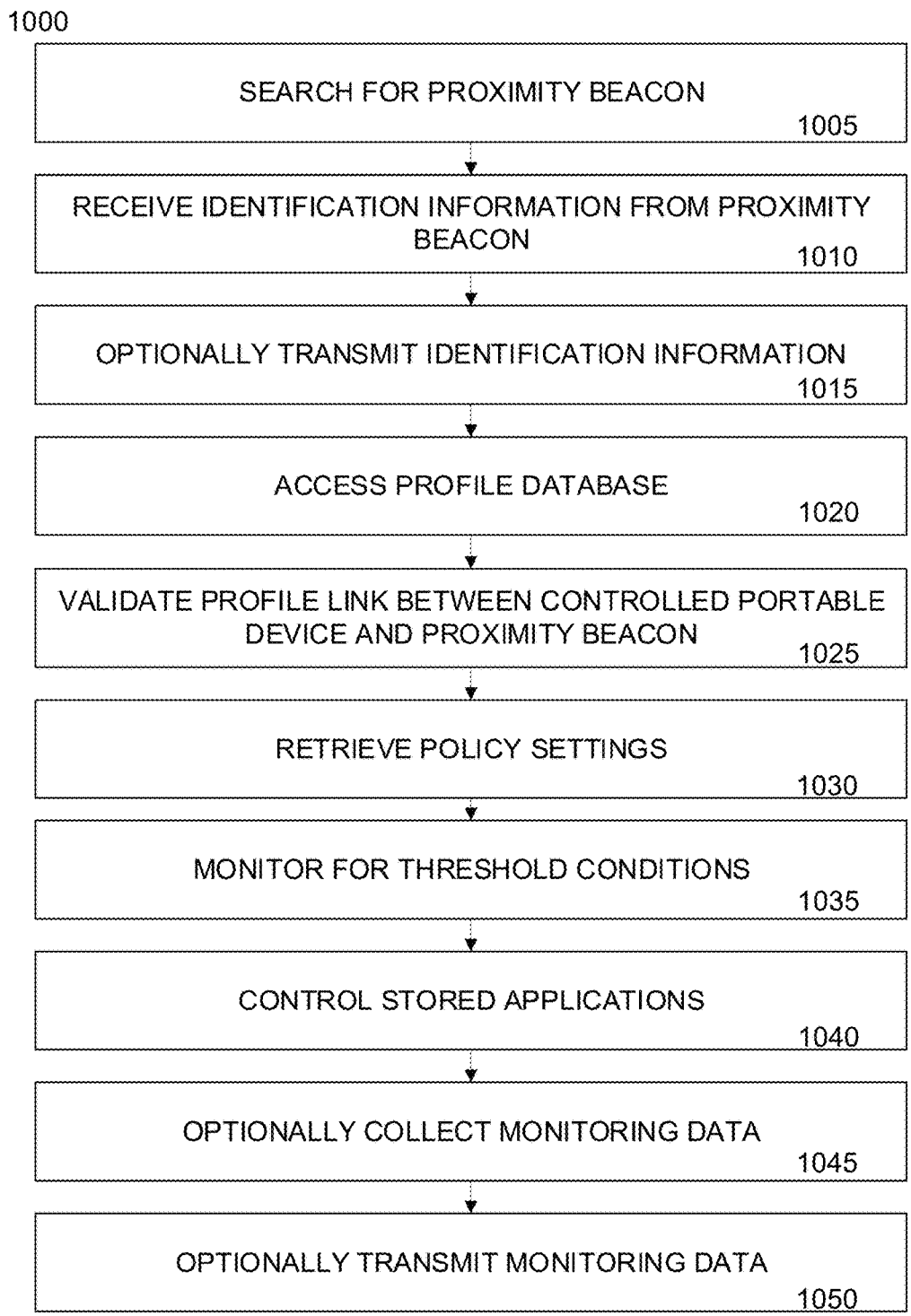
FIG. 10 illustrates exemplary method steps for controlling and monitoring a controlled portable device.

Referring now to FIG. 10, exemplary method steps for controlling and monitoring a controlled portable device are illustrated. At 1005, a proximity beacon may be searched for. At 1010, proximity beacon identification information may be received. In some aspects, at 1015, identification information may be transmitted. At 1020, a profile database may be accessed. At 1025, a profile link between a controlled portable device and proximity beacon may be validated. At 1030, policy settings may be retrieved. At 1035, threshold conditions may be monitored. At 1040, stored applications may be controlled when one or more threshold conditions are observed. In some aspects, at 1045, monitoring data may be collected, and, at 1050, monitoring data may be transmitted.

Figure 11:
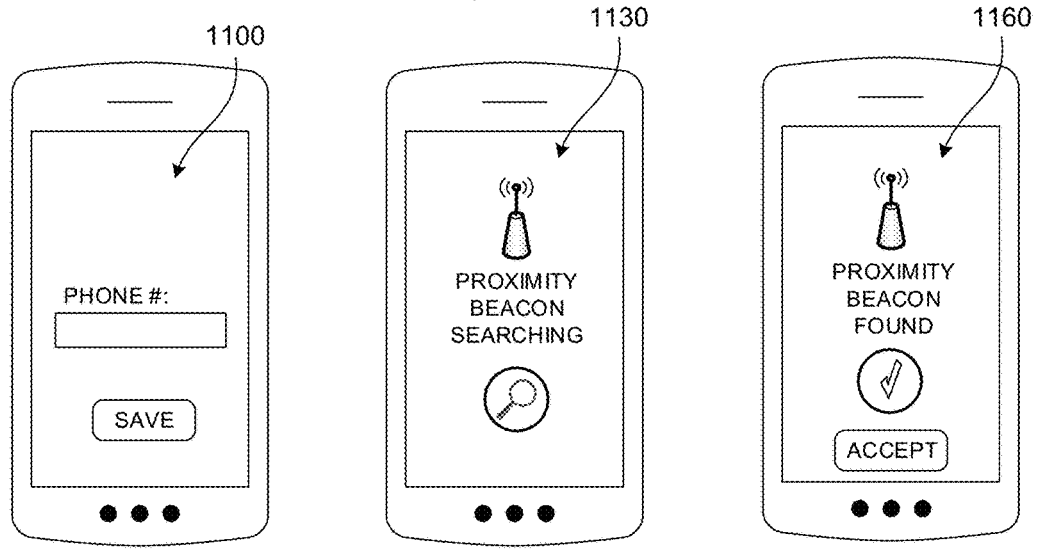
FIG. 11 illustrates exemplary graphical user interfaces (GUI) for a local application for a controlled portable device.

Referring now to FIG. 11, exemplary graphical user interfaces (GUI) for a local application of a controlled portable device are illustrated. In some embodiments, a phone number input GUI 1100 may prompt input of the phone number of the controlled portable device. In some aspects, manual input of the phone number may not be required. In some aspects, a GUI may request a user name input with an accompanying password. In some embodiments, log-in information or a unique identifier may be provided by an administrator for a user to input into the GUI. In some implementations, a proximity beacon search GUI 1130 may indicate an active search for nearby proximity beacons. In some aspects, a confirmation GUI 1160 may prompt acceptance of the detected proximity beacon in association with the controlled portable device.

Figure 12:
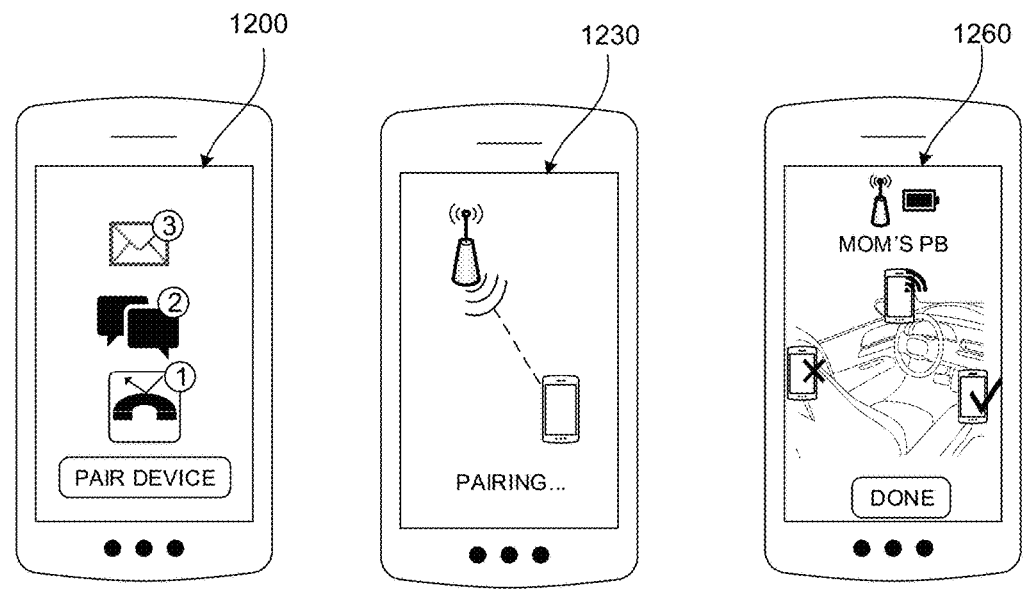
FIG. 12 illustrates exemplary graphical user interfaces (GUI) for a local application for a controlled portable device.

Referring now to FIG. 12, exemplary graphical user interfaces (GUI) for a local or native application for a controlled portable device are illustrated, wherein the application may be downloaded to the controlled portable device. In some implementations, a driver may download the application. In some embodiments, an administrator, such as a parent or employer, may download the application prior to providing the controlled portable device to the driver. In some aspects, a home GUI 1200 may present a driver dashboard, wherein selected information may be displayed. For example, a home GUI 1200 may indicate pending notifications from controlled applications, such as those that may have been blocked by the driver communication safety system.

In some embodiments, a refresh proximity beacon search GUI 1230 may search for the presence of the linked proximity beacon that may be confirmed in the confirmation GUI, such as illustrated in FIG. 11. In some aspects, the refresh proximity beacon search GUI 1230 may appear periodically, such as when the vehicle is turned on, which may ensure that proximity beacon is properly paired to the portable device prior to driving. In some embodiments, a user may be alerted if the link fails or is not confirmed through the driver communication safety system.

In some implementations, a calibration GUI 1260 may prompt a driver to take steps to calibrate the shielded zone. In some aspects, the calibration GUI 1260 may prompt a driver to place the controlled portable device in multiple locations within the vehicle, such as at the back of the driver's seat, at the center console, and at the window by the steering wheel. The locations may help form the boundaries of the shielded zone. In some embodiments, such as where the beacon may be integrated into the vehicle, a calibration may be required only when there is a new driver or the driver's area settings are changed. In some aspects, such as where the beacon is portable, a calibration may be beneficial prior to each drive.

Figure 13:
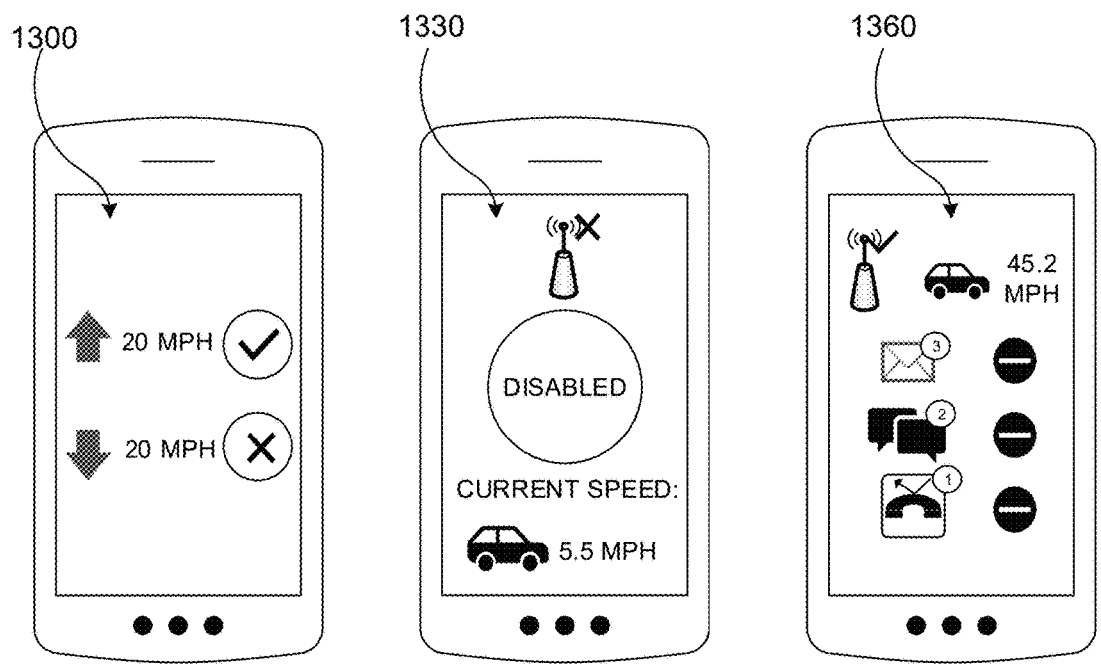
FIG. 13 illustrates exemplary graphical user interfaces (GUI) for a local application for a controlled portable device.

Referring now to FIG. 13, exemplary graphical user interfaces (GUI) for a local or native application for a controlled portable device are illustrated. In some aspects, a threshold GUI 1300 may allow one or both a driver and administrator to adjust threshold settings. In some embodiments, the threshold GUI 1300 may present limited threshold options, wherein the settings may be fine-tuned but not completely overridden. In some aspects, access to the threshold GUI 1300 may be limited to administrator access, wherein the options may be viewable and not changed in the threshold GUI 1300.

In some embodiments, a shield status GUI 1330 may indicate the status of the shielded zone or signal strength of the controlled portable device. In some aspects, a policy status GUI 1360 may indicate the control status of one or more stored applications. In some embodiments the policy status GUI 1360 may be limited to showing controlled stored applications. In some aspects, the policy status GUI 1360 may display any stored applications that may be controlled. In some implementations, the policy status GUI 1360 may display any pending notifications from controlled applications, such as those that may be blocked while driving.

Referring now to FIG. 14, profiles initializing graphical user interfaces (GUI) 1400, 1430, 1460 are illustrated. In some aspects, a log-in GUI 1400 may prompt an administrator or driver to log in. If there is a first-time user, they may be prompted with a registration request. In some embodiments, a beacon and vehicle link GUI 1430 may prompt input of identification information of at least one proximity beacon and at least one calibrated vehicle. The beacon and vehicle link GUI 1430 may establish a first link that may prompt the creation of a unique profile identifier. In some aspects, a driver input GUI 1460 may prompt input of at least one phone number and identification information for at least one driver. In some implementations, a driver input GUI 1460 may collect blocked notifications for a user to review once the shield is deactivated or the calibrated vehicle has come to a stop.

Figure 15:
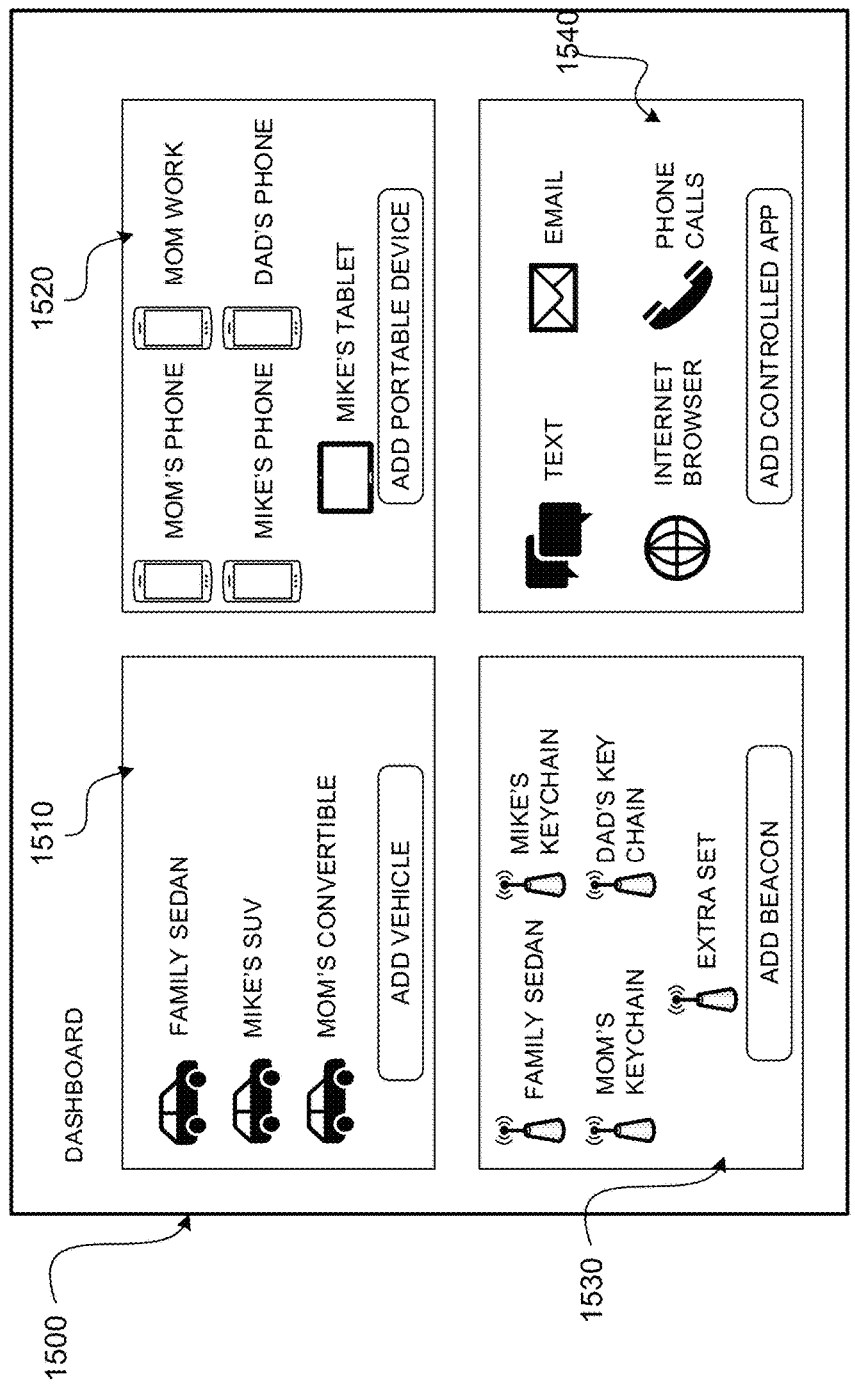
FIG. 15 illustrates an exemplary administrative dashboard graphical user interface (GUI).

Referring now to FIG. 15, an exemplary administrative dashboard graphical user interface (GUI) 1500 is illustrated. In some embodiments, the administrative dashboard GUI 1500 may provide a snapshot of all the managed proximity beacons 1530, calibrated vehicles 1510, controlled portable devices 1520, and controlled applications 1540. In some implementations, the administrative dashboard GUI 1500 may allow a family member to manage the driver communication safety system settings for the entire family from a central location, which may encourage use.

In some aspects, an administrative dashboard GUI 1500 may display select information relating to one or more drivers, the stored applications 1540 associated with one or more controlled portable devices 1520, options for communication with the user, the current time elapsed for a drive, and/or estimated time of arrival. In some embodiments, a single administrative dashboard GUI 1500 may allow an administrator to access multiple controlled portable devices 1520 from one access point. For example, a trucking company may want to manage their fleet of tractor-trailers and their drivers from a central dashboard.

In some aspects, an administrator or driver may have the option to rename one or more proximity beacon, vehicle, or controlled portable device. For example, a vehicle may be renamed "Dad's SUV", and a controlled portable device may be renamed "Jack's Android" or "Jill's iPhone." In some implementations, such as where the proximity beacons may be portable, the proximity beacons may be nicknamed. For example, where a proximity beacon may be integrated with a key, nicknames may include "extra set" for an extra set of keys or "family sedan" for the family car. As another example, where a proximity beacon may be attached to a keychain, nicknames may include "mom's keychain" or "Mike's keychain."

Figure 16:
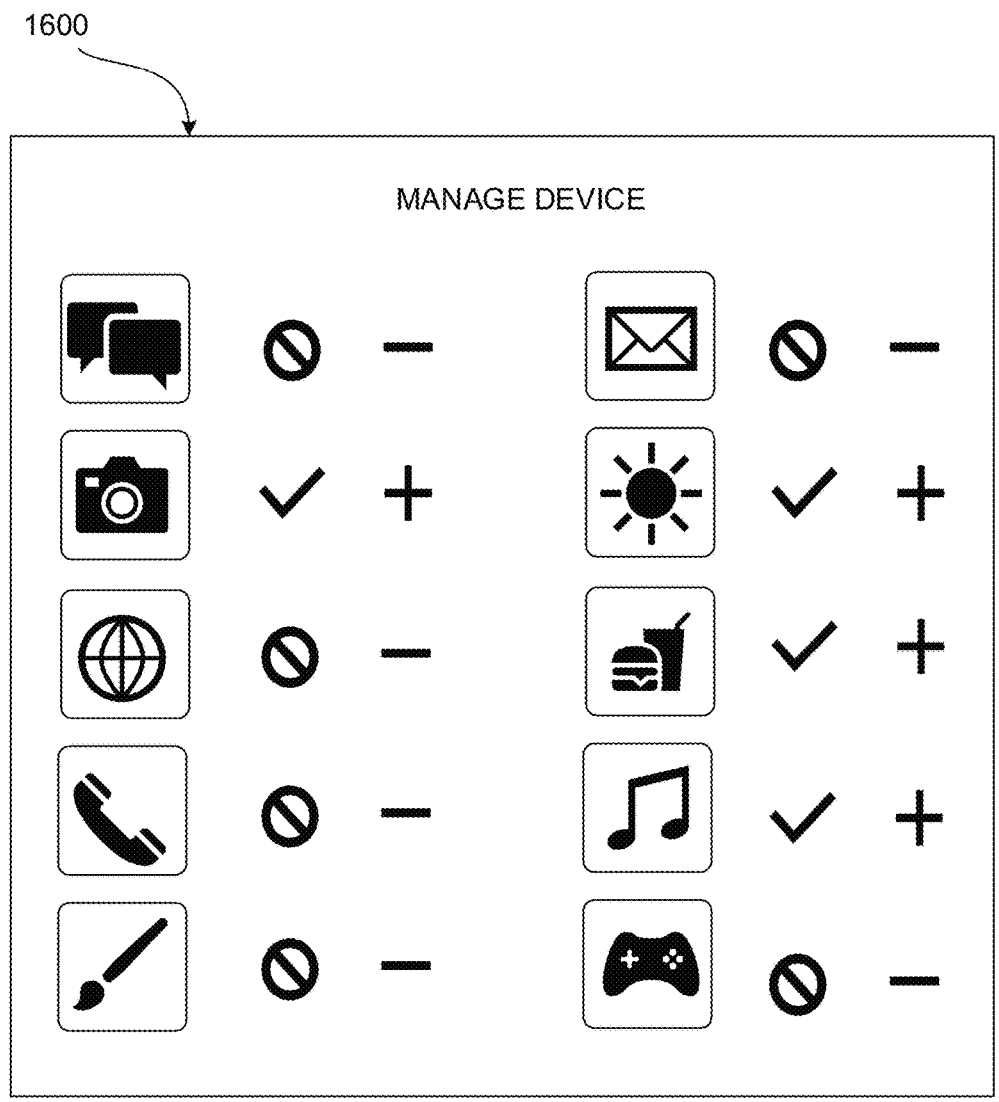
FIG. 16 illustrates an exemplary policy setting graphical interface (GUI).

Referring now to FIG. 16, an exemplary policy setting graphical interface (GUI) 1600 is illustrated. In some embodiments, a policy setting GUI 1600 may present stored applications associated with one or more controlled portable devices, wherein control over stored applications may be toggled on and off. Stored applications may include those with functionality related to calls, texting, internet browsing, mail, camera, music, and gaming, as non-limiting examples.

Referring now to FIG. 17, an exemplary monitoring graphical interface (GUI) 1700 is illustrated. In some aspects, a monitoring GUI 1700 may present collected monitored data, such as, for example, location 1760, speed 1720, 1730, access attempts 1790, or other data. In some embodiments, the monitored data may be presented in a variety of display methods. For example, travel data may be presented as an overlay over a map 1710, and access attempts may be displayed in a list form with stored applications attempts 1790.

In some embodiments, the map 1710 may include icons for select locations, such as frequented places, which may include home 1780, popular stores 1770, and popular restaurants 1775. In some aspects, the map 1710 may include the driver's starting location 1740 and intended destination 1750. In some implementations, the monitoring GUI 1700 may display speed in relative visualization for speeding 1720 and driving under the speed limit 1730, wherein portions of the drive where the driver exceeded the speed limit is indicated with one color or pattern and portions of the drive where the driver was under the speed limit is indicated with a different color or pattern.

In some embodiments, the monitoring GUI 1700 may allow an administrator to easily digest relevant information, allowing them to quickly determine if they need to be alarmed by any of the activity. In some aspects, the monitoring GUI 1700 may be customizable wherein an administrator may select what information may be shown. For example, parents may care about where their child frequents, but that information may not apply in a commercial use. Parents may also care whether their child is attempting to access applications on their controlled portable device as a way to track behavior, whereas a trucking company may only care that the applications are effectively blocked for insurance purposes. As another example, a trucking company may want to know the actual speeds of their fleet, and not just whether the speed exceeds the limit, as actual speeds may be useful for insurance purposes as well as improving and tracking efficiency.

Figure 18:
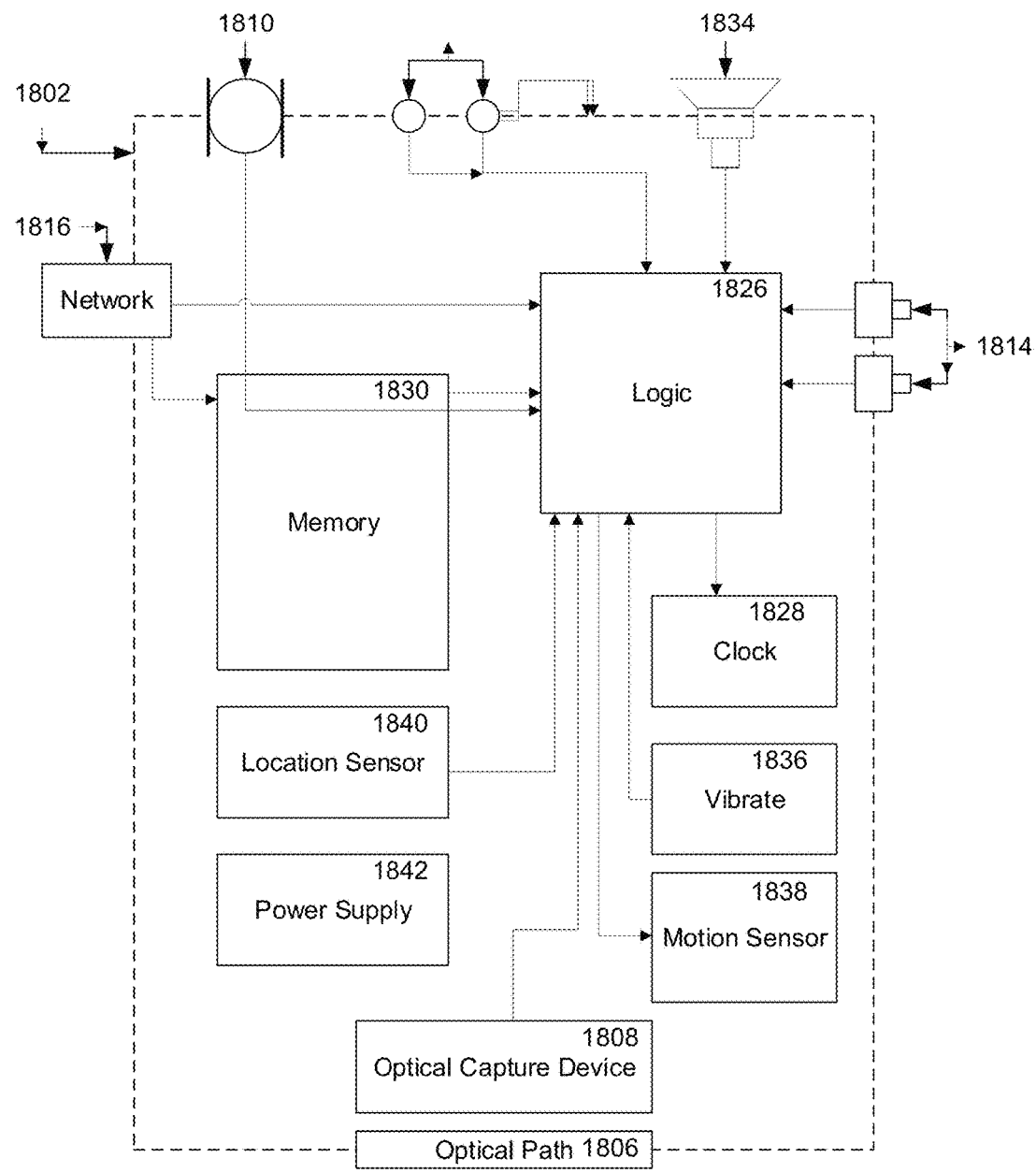
FIG. 18 illustrates an exemplary block diagram of an embodiment of a mobile device.

Referring now to FIG. 18, an exemplary block diagram of an exemplary embodiment of a mobile device 1802 is illustrated. The mobile device 1802 may comprise an optical capture device 1808, which may capture an image and convert it to machine-compatible data, and an optical path 1806, typically a lens, an aperture, or an image conduit to convey the image from the rendered document to the optical capture device 1808. The optical capture device 1808 may incorporate a Charge-Coupled Device (CCD), a Complementary Metal Oxide Semiconductor (CMOS) imaging device, or an optical sensor of another type.

In some embodiments, the mobile device 1802 may comprise a microphone 1810, wherein the microphone 1810 and associated circuitry may convert the sound of the environment, including spoken words, into machine-compatible signals. Input facilities 1814 may exist in the form of buttons, scroll-wheels, or other tactile sensors such as touchpads. In some embodiments, input facilities 1814 may include a touchscreen display. Visual feedback to the user may occur through a visual display, touchscreen display, or indicator lights. Audible feedback 1834 may be transmitted through a loudspeaker or other audio transducer. Tactile feedback may be provided through a vibration module 1836.

In some aspects, the mobile device 1802 may comprise a motion sensor 1838, wherein the motion sensor 1838 and associated circuitry may convert the motion of the mobile device 1802 into machine-compatible signals. For example, the motion sensor 1838 may comprise an accelerometer, which may be used to sense measurable physical acceleration, orientation, vibration, and other movements. In some embodiments, the motion sensor 1838 may comprise a gyroscope or other device to sense different motions.

In some implementations, the mobile device 1802 may comprise a location sensor 1840, wherein the location sensor 1840 and associated circuitry may be used to determine the location of the device. The location sensor 1840 may detect Global Position System (GPS) radio signals from satellites or may also use assisted GPS where the mobile device may use a cellular network to decrease the time necessary to determine location. In some embodiments, the location sensor 1840 may use radio waves to determine the distance from known radio sources such as cellular towers to determine the location of the mobile device 1802. In some embodiments these radio signals may be used in addition to and/or in conjunction with GPS.

In some aspects, the mobile device 1802 may comprise a logic module 1826, which may place the components of the mobile device 1802 into electrical and logical communication. The electrical and logical communication may allow the components to interact. Accordingly, in some embodiments, the received signals from the components may be processed into different formats and/or interpretations to allow for the logical communication. The logic module 1826 may be operable to read and write data and program instructions stored in associated storage 1830, such as RAM, ROM, flash, solid-state, hybrid, or other suitable memory. In some aspects, the logic module 1826 may read a time signal from the clock unit 1828. In some embodiments, the mobile device 1802 may comprise an on-board power supply 1842. In some embodiments, the mobile device 1802 may be powered from a tethered connection to another device, such as a Universal Serial Bus (USB) connection.

In some implementations, the mobile device 1802 may comprise a network interface 1816, which may allow the mobile device 1802 to communicate and/or receive data to a network and/or an associated computing device. The network interface 1816 may provide two-way data communication. For example, the network interface 1816 may operate according to an internet protocol. As another example, the network interface 1816 may comprise a local area network (LAN) card, which may allow a data communication connection to a compatible LAN. As another example, the network interface 1816 may comprise a cellular antenna and associated circuitry, which may allow the mobile device to communicate over standard wireless data communication networks. In some implementations, the network interface 1816 may comprise a Universal Serial Bus (USB) to supply power or transmit data. In some embodiments, other wireless links known to those skilled in the art may also be implemented.

Figure 19:
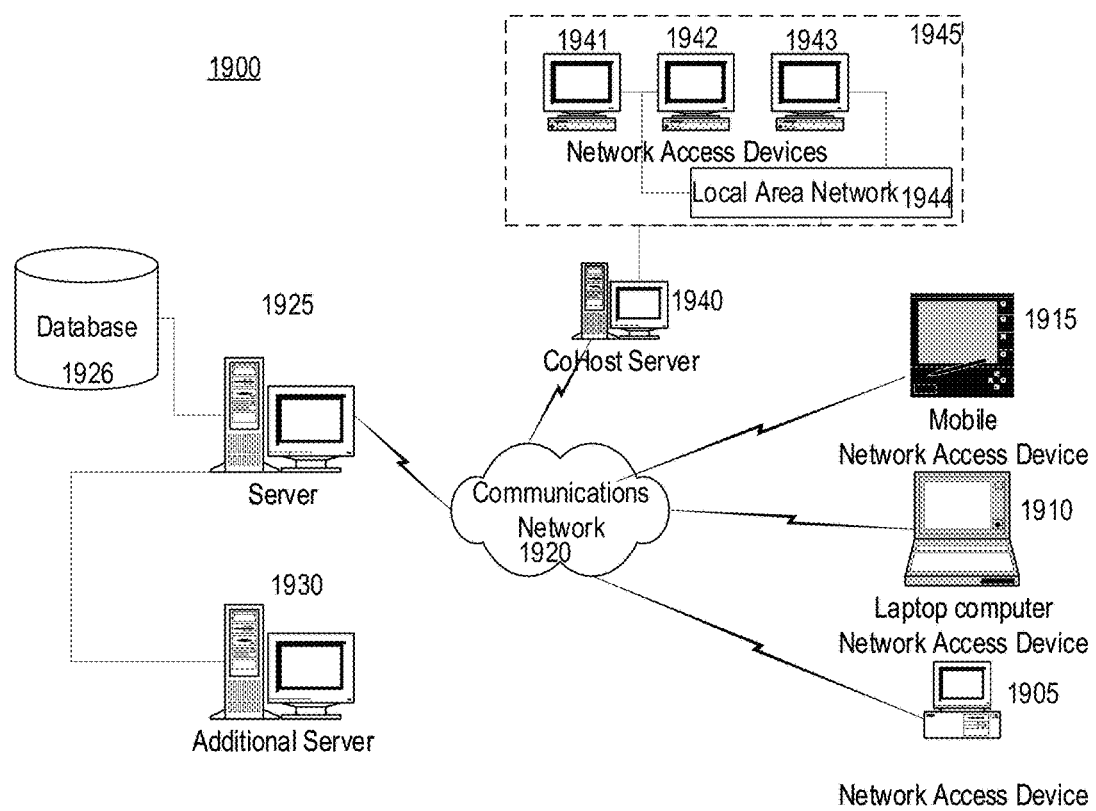
FIG. 19 illustrates an exemplary processing and interface system.

Referring now to FIG. 19, an exemplary processing and interface system 1900 is illustrated. In some aspects, access devices 1915, 1910, 1905, such as a paired portable device 1915 or laptop computer 1910 may be able to communicate with an external server 1925 through a communications network 1920. The external server 1925 may be in logical communication with a database 1926, which may comprise data related to identification information and associated profile information. In some embodiments, the server 1925 may be in logical communication with an additional server 1930, which may comprise supplemental processing capabilities.

In some aspects, the server 1925 and access devices 1905, 1910, 1915 may be able to communicate with a cohost server 1940 through a communications network 1920. The cohost server 1940 may be in logical communication with an internal network 1945 comprising network access devices 1941, 1942, 1943 and a local area network 1944. For example, the cohost server 1940 may comprise a payment service, such as PayPal or a social network, such as Facebook or a dating website. In some aspects, one or both the administrator and driver may link the driver profile to a social media profile, wherein specified data may be periodically or manually shared to associated social media profiles.

For example, a driver may use a map application and input coordinates for a long drive, wherein the driver may have limited communication abilities on the controlled portable device for an extended period of time. The driver may link his driver communication safety system profile to his Facebook or Twitter account, wherein a post or tweet is transmitted once the calibrated vehicle reaches a threshold speed, which may notify his network that he has limited communication abilities. The post may include an estimate for the expected time period, details of the trip, instructions on how to reach him during times of limited communication, or other information, which may be set by one or both the driver or administrator. This may also be available on the user profile page for an administrator to access and track.

In some aspects, an administrator may link driver activity to a company website or social media profile, wherein driver activity may be shared with people who follow the company. For example, a driver may be transporting important or unique cargo, and followers may be interested in tracking the transportation.

Conclusion

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A driver communication safety system comprising:
a first proximity beacon configured to be placed in a first vehicle and paired with a first portable device, wherein placement of the first proximity beacon in the first vehicle creates a first shielded zone comprising a first designated safety area wherein the driver communication safety system is functional;
one or more wireless communication interfaces;
one or more memory resources comprising:
a user profile database comprising a plurality of user profiles, wherein each user profile comprises at least:

a first proximity beacon identifier, wherein the first proximity beacon identifier identifies the first proximity beacon, and a first portable device identifier, wherein the first portable device identifier identifies the first portable device; and one or more processors to:
receive the first proximity beacon identifier;
receive the first portable device identifier;
access the user profile database;
validate a user profile link between the first proximity beacon identifier and the first portable device identifier;
receive a first proximity data comprising an indication that the first portable device is located within the first shielded zone;
activate the first shielded zone, wherein the activation limits a predefined set of functionalities of the first portable device based on predefined activation threshold criteria comprising at least a presence of the first portable device within the first shielded zone;
receive a second proximity data comprising an indication that the first portable device is located outside the first shielded zone; and
deactivate the first shielded zone, wherein the deactivation releases the limitation of the predefined set of functionalities of the first portable device based on predefined deactivation threshold criteria comprising at least a removal of the first portable device from the first shielded zone.

2. The driver communication safety system of claim 1, wherein the one or more processors are further configured to:
retrieve the predefined activation threshold criteria; and
retrieve the predefined deactivation threshold criteria.

3. The driver communication safety system of claim 2, wherein the one or more processors are further configured to:
monitor for the predefined activation threshold criteria; and
monitor for the predefined deactivation threshold criteria.

4. The driver communication safety system of claim 3, wherein the one or more processors are further configured to transmit monitoring data to the user profile database, wherein the monitoring data comprises data gathered through the monitoring of the predefined activation threshold criteria and the predefined deactivation threshold criteria.

5. The safety system of claim 1, wherein one or both the predefined activation threshold criteria and the predefined deactivation threshold criteria comprise a threshold vehicle speed, and wherein the one or more processors are further configured to receive vehicle speed data.

6. The safety system of claim 5, wherein the vehicle speed is received from one or both the first proximity beacon and the first portable device.

7. The driver communication safety system of claim 1, wherein the first proximity beacon is portable.

8. The driver communication safety system of claim 7, wherein the first shielded zone comprises a fixed distance range from the first proximity beacon.

9. The driver communication safety system of claim 7, wherein the one or more processors are configured to prompt calibration of the first shielded zone.

10. The driver communication safety system of claim 9, wherein the first shielded zone is based on predefined characteristics of the first vehicle and a location of the first proximity beacon.

11. The driver communication safety system of claim 1, wherein each of the plurality of user profiles further comprises vehicle identifying data, wherein the vehicle identifying data associates the first vehicle with the first proximity beacon and the first portable device.

12. The driver communication safety system of claim 11, wherein the first proximity beacon is integrated into the first vehicle.

13. The driver communication safety system of claim 11, wherein the first proximity beacon is portable.

14. The driver communication safety system of claim 13, wherein the first proximity beacon is further configured to be placed in a second vehicle, wherein placement of the first proximity beacon in the second vehicle creates a second shielded zone comprising a second designated safety area wherein the driver communication safety system is functional, and wherein the one or more processors are further configured to:
receive a third proximity data comprising an indication that the first portable device is located within the second shielded zone;
activate the second shielded zone, wherein the activation limits the predefined set of functionalities of the first portable device based on predefined activation threshold criteria comprising at least a presence of the first portable device within the second shielded zone;
receive a fourth proximity data comprising an indication that the first portable device is located outside the second shielded zone; and
deactivate the second shielded zone, wherein the deactivation releases the limitation of the predefined set of functionalities based on predefined deactivation threshold criteria comprising at least a removal of the first portable device from the second shielded zone.

15. The driver communication safety system of claim 14, wherein the vehicle identifying data further associates the second vehicle with the first proximity beacon and the first portable device.

16. The driver communication safety system of claim 14, wherein the first shielded zone comprises a first distance from the first proximity beacon and the second shielded zone comprises a second distance from the first proximity beacon.

17. The driver communication safety system of claim 1, wherein the first proximity beacon is further configured to be paired with a second portable device;
wherein at least a portion of the plurality of user profiles comprises a second portable device identifier, wherein the second portable device identifier identifies the second portable device; and
the one or more processors are further configured to:
receive the second portable device identifier;
access the user profile database;
validate a user profile link between the first proximity beacon identifier and the second portable device identifier;
receive a third proximity data comprising an indication that the second portable device is located within the first shielded zone;
activate the first shielded zone, wherein the activation limits a predefined set of functionalities of the second portable device based on predefined activation threshold criteria comprising at least a presence of the second portable device within the first shielded zone;

receive a fourth proximity data comprising an indication that the second portable device is located outside the first shielded zone; and deactivate the first shielded zone, wherein the deactivation releases the limitation of the predefined set of functionalities of the second portable device based on predefined deactivation threshold criteria comprising at least a removal of the second portable device from the first shielded zone.

18. The driver communication safety system of claim 17, wherein the predefined set of functionalities of the first portable device is different from the predefined set of functionalities of the second portable device.

19. The driver communication safety system of claim 1, further comprising a second proximity beacon configured to be placed in the first vehicle and paired with the first portable device, wherein placement of the second proximity beacon in the first vehicle creates a second shielded zone comprising a second designated safety area wherein the driver communication safety system is functional;

wherein at least a portion of the plurality of user profiles comprises a second proximity beacon identifier, wherein the second proximity beacon identifier identifies the second proximity beacon; and wherein the one or more processors are further configured to:

receive the second proximity beacon identifier;

validate a user profile link between the second proximity beacon identifier and the first portable device identifier;

receive a third proximity data comprising an indication that the first portable device is located within the second shielded zone;

activate the second shielded zone, wherein the activation limits the predefined set of functionalities of the first portable device based on predefined activation threshold criteria comprising at least a presence of the first portable device within the second shielded zone;

receive a fourth proximity data comprising an indication that the first portable device is located outside the second shielded zone; and deactivate the second shielded zone, wherein the deactivation releases the limitation of the predefined set of functionalities of the first portable device based on predefined deactivation threshold criteria comprising at least a removal of the first portable device from the second shielded zone.

20. The driver communication safety system of claim 1, wherein each of the plurality of user profiles further comprises:

the predefined set of functionalities of the first portable device, the predefined activation threshold criteria, and the predefined deactivation threshold criteria; and wherein the one or more processors are further configured to:

receive controlled functionality preferences, wherein the controlled functionality preferences identify the predefined set of functionalities of the first portable device, receive predefined activation threshold preferences, wherein the predefined activation threshold preferences identify the predefined activation threshold criteria, and receive predefined deactivation threshold preferences, wherein the predefined deactivation threshold preferences identify the predefined deactivation threshold criteria.

\* \* \* \* \*